April 6, 1954  S. W. ALDERFER  2,674,486
COMBINATION SAFETY BRACE AND DOOR OPERATOR
Filed May 18, 1953  3 Sheets-Sheet 1
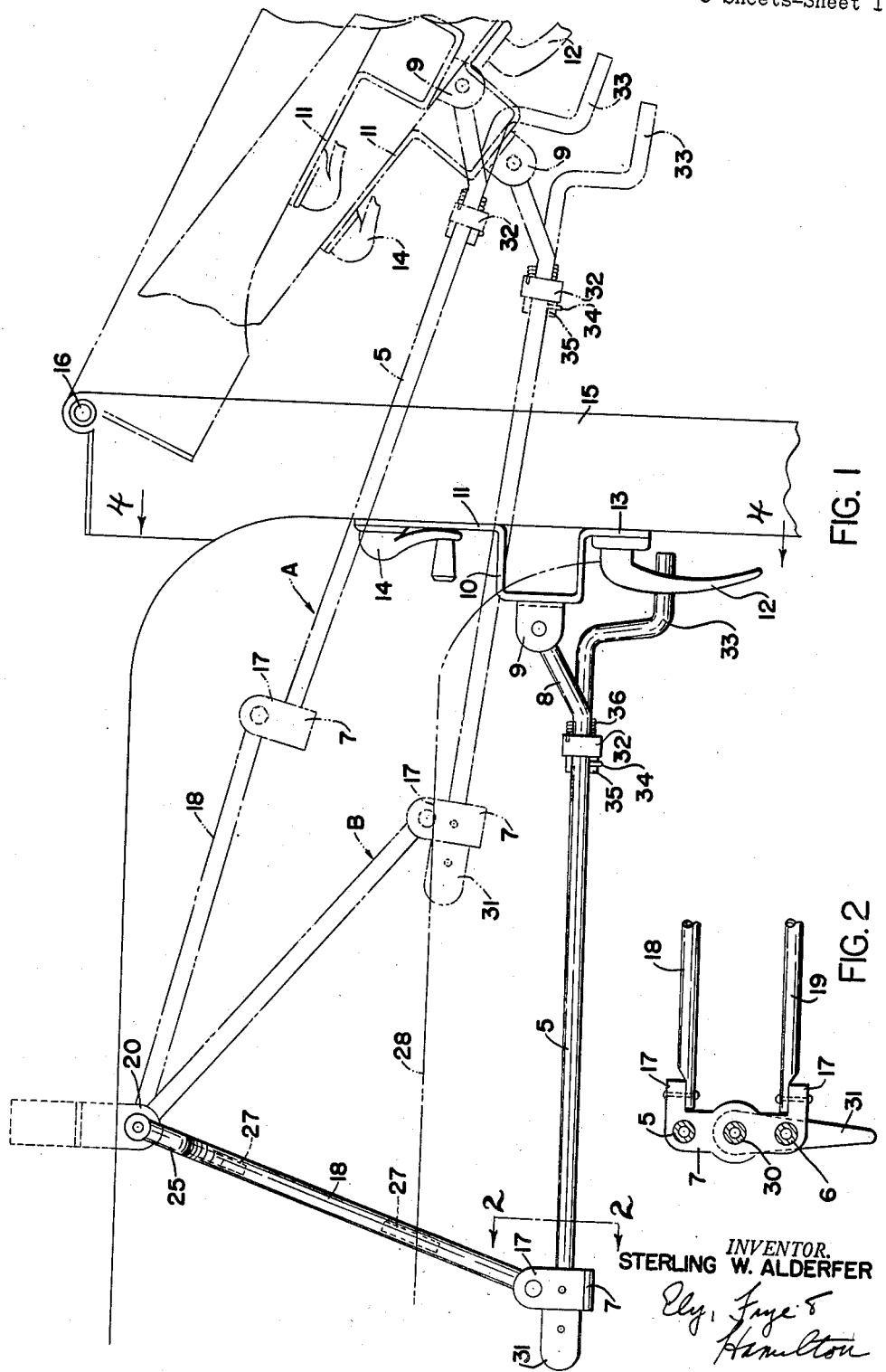
INVENTOR.
STERLING W. ALDERFER
ATTYS.

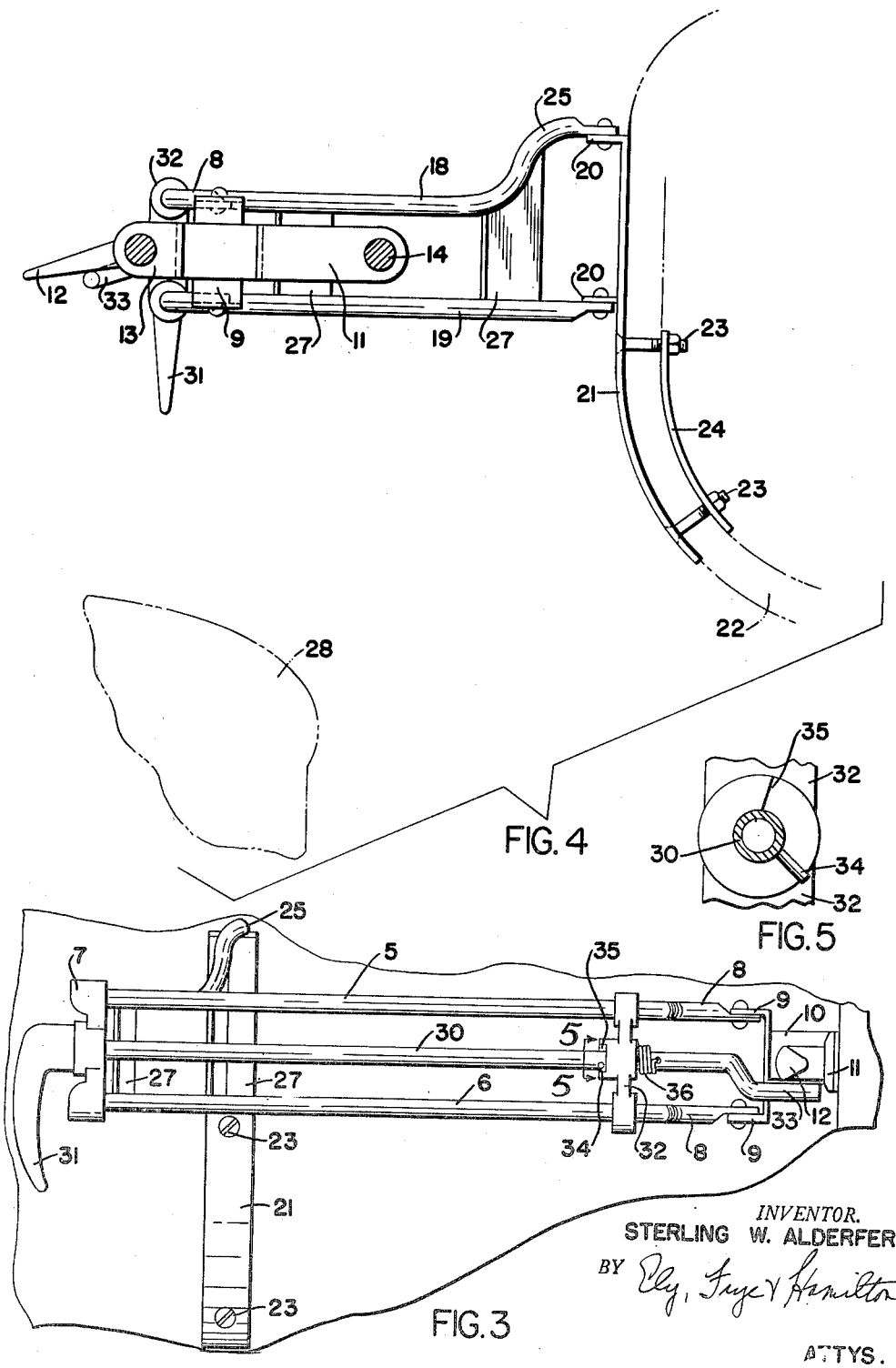

April 6, 1954  S. W. ALDERFER  2,674,486
COMBINATION SAFETY BRACE AND DOOR OPERATOR
Filed May 18, 1953  3 Sheets-Sheet 3
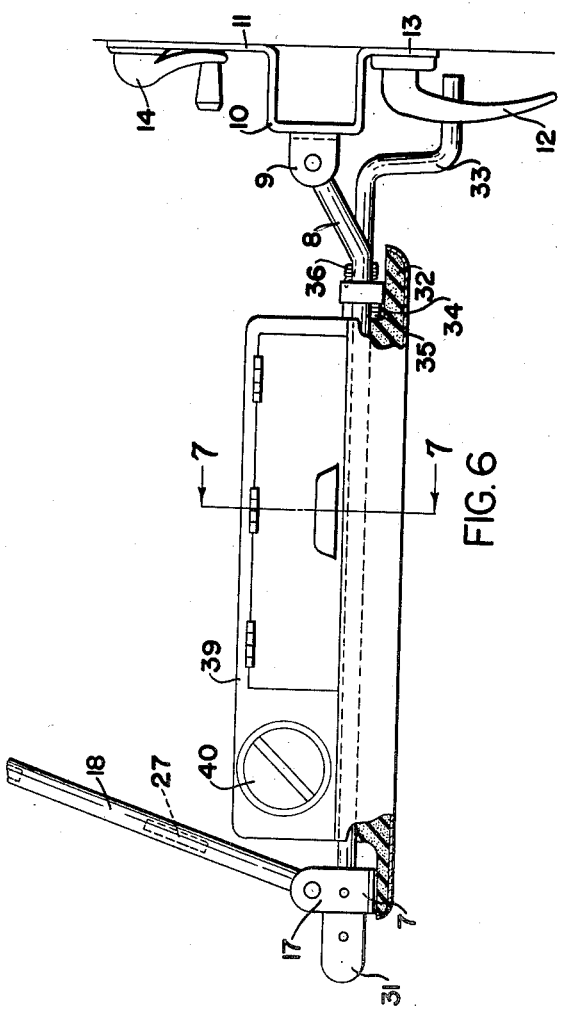
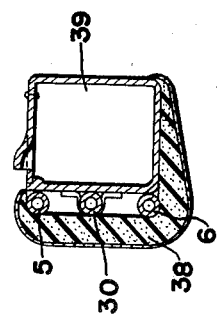
INVENTOR.
STERLING W. ALDERFER
ATTYS.

Patented Apr. 6, 1954

2,674,486

UNITED STATES PATENT OFFICE 2,674,486

COMBINATION SAFETY BRACE AND DOOR OPERATOR

Sterling W. Alderfer, Akron, Ohio

Application May 18, 1953, Serial No. 355,441

15 Claims. (Cl. 296—44)

The invention relates generally to a safety device for the occupant of the front seat beside the driver of an automobile, and more particularly to a safety device which embodies means for operation by the driver of the door on his far side.

The modern automobile travels at very high speeds, resulting in an increasing number of accidents due to collisions. In order to minimize accidents as much as possible, all cars are now equipped with powerful four-wheel brakes, enabling the automobile driver to stop very suddenly. When the car is stopped very suddenly, either by applying the full restraining force of the brakes or by colliding with another car or other object, the occupants of the car are thrown forward forcibly because of their momentum.

In such cases, it is the occupant of the front seat next to the driver who is most often severely or critically injured because he has nothing but the floor against which to brace himself from being thrown into the instrument panel and windshield. Quite frequently, the driver of the car is injured the least of any of the occupants because of being able to brace himself against the steering wheel.

Another feature of the majority of modern automobiles which creates a serious disadvantage is the extended width of the front seat to increase its seating capacity. This results in the door on the far side of the driver being substantially out of his reach, unless he leans far out from behind the wheel, which makes it not only awkward and difficult for him to open the door to admit a passenger or to close it after discharging one, but also makes it dangerous if the driver has stopped on a hill, because he is apt to release the brake and lose control of the car as he leans over.

The purposes of the present invention include the provision of a novel and improved safety device which protects the occupant of the front seat of an automobile beside the driver from injury due to sudden stops and collisions, and at the same time provides convenient means by which the driver can easily open the door on his far side without leaning out from behind the steering wheel.

More specifically, it is an object of the present invention to provide a safety brace located over the lap of a front seat passenger when the adjacent door is closed, and adapted to swing out of the way when the door is opened.

Another object is to provide a novel safety brace in front of the front seat passenger operatively connected to the adjacent door and operable by the driver to open and close said door.

A further object is to provide a novel combination safety brace and door opener which is hingedly mounted on the door and instrument panel, and positioned in front of the front seat passenger when the door is closed.

These and other objects are accomplished by the parts, combinations and arrangements comprising the present invention, a preferred embodiment of which is shown by way of example in the accompanying drawings, and described in detail herein. It is to be understood that various modifications and changes in details of construction and arrangement may be made without departing from the scope of the invention as defined in the appended claims.

Referring to the drawings:

Fig. 1 is a plan view showing the novel device mounted over the front seat in an automobile with the adjacent door closed, the position of the parts in door-open position being indicated in dotted lines;

Fig. 2 is a sectional view on line 2—2, Fig. 1;

Fig. 3 is an elevation of the device, looking toward the instrument panel;

Fig. 4 is a side elevation looking inward from the plane of the door in closed position, as on line 4—4, Fig. 1;

Fig. 5 is a fragmentary sectional view as on line 5—5, Fig. 3;

Fig. 6 is a plan view of a modified form of the device; and

Fig. 7 is a sectional view on line 6—6, Fig. 5.

The novel device includes a brace or hand bar unit extending transversely over the front portion of the front seat of an automobile at the side of the steering wheel so as to be positioned over the lap of a passenger sitting in the front seat beside the driver. The brace is solidly hinged at one end on the inside of the adjacent door and the other end is pivotally connected to the instrument panel for swinging out of the way when the door is opened.

The brace or hand bar may include vertically spaced upper and lower horizontal bars 5 and 6 which are mounted at their inner ends in a bracket 7. The outer end portions 8 of the bars are angled forwardly and pivoted to ears 9 on a U-shaped bracket 10, which may have one leg 11 secured around the door handle 12 and the other leg 13 secured around the usual window crank handle 14 of the door 15 hinged at 16 on the body of the automobile opposite the instrument panel.

The bracket 7 preferably has forwardly extending ears 17, and upper and lower links 18 and 19 are pivoted at their rear ends to the ears 17 and at their front ends to ears 20 formed on a strap bracket 21 mounted on a frame member 22 of the instrument panel. As shown in Fig. 3, the strap bracket 21 may be connected by bolts 23 to a strap 24 behind the frame member 22. The front end portion 25 of the upper link 18 may be curved upwardly to space the pivot connections between the links and bracket 21 farther apart, and the links may be connected by plates 27 to impart greater rigidity to the links.

The hand bars 5 and 6 are mounted to extend transversely across the automobile substantially over the front portion 28 of the front seat, so as to be substantially above the lap of a passenger sitting in said seat, and in a convenient position to be grasped comfortably by said passenger at any time. If the car is stopped suddenly by brakes or a collision, it is instinctive for the passenger to reach forwardly for something to brace himself, and the bars are positioned where it is natural for the passenger to reach.

A door operating shaft 30 may be positioned between the bars 5 and 6 and parallel thereto. The inner end of the bar is preferably journaled in the bracket 7 and has a handle 31 secured thereon. The bar 30 is journaled near its outer end in a bracket 32 secured at its ends on bars 5 and 6 and a crank 33 is formed on the outer end of shaft 30 for engaging the door handle 12. Hence rotation of the handle 31 will rotate the crank 33 and operate handle 12 to open the door. Preferably, bar 30 has a pin 34 working in a notch 35 in bracket 32 for limiting rotation of the operating shaft 30 between door-open and door-closed position. A torsion spring 36 secured at one end to the shaft 30 and at the other to the bracket 32 urges the operating shaft 30 to its door-closed position.

As indicated in broken lines in Fig. 1, when the door 15 is swung open the links 18 swing to the right or outside and the bars 5, 6 and 30 move forwardly away from the seat, so as to be out of the way when the passenger steps in or out of the door. The position of the parts when the door is fully open is shown at A and their position when the door is partly open is shown at B. In the position A, the pivot connections between the ears 17 and the links 18 and 19 swing over center with respect to the pivots on ears 20 on the instrument panel and the pivots on ears 9 on the door. Thus the door is locked in fully open position by the linkage until the pivots in ears 17 are swung back over center. When the door is closed the links 18 and 19 solidly back up the brace bars so that the passenger seated behind them has a conveniently solid and comfortable brace at all times. Moreover, the position of the brace bars is such that the passenger can lean or recline against them when riding normally.

The door operating handle 31 is conveniently positioned at one side of the driver where he can readily grasp it to open or close the door without leaning out from behind the wheel and without taking his eyes from the road. Thus the novel device not only provides safety for the passenger in the case of sudden stops, but safety and convenience for the driver when he is required to open or close the door on his far side.

As shown in Fig. 5, the rear sides of the bars 5, 6 and 30 may be covered with a layer of foam rubber 38 (preferably fabric covered) to give still greater protection to the passenger against shocks and jolts. Also, an auxiliary accessories box or glove compartment 39 may be mounted on the front sides of the bars and the foam rubber extended around the bottom of the box. Such a box is always out of the way and the top thereof affords additional space on which to recline or support various objects, such as an ash tray 40. As shown, the foam rubber covering is extended laterally to cover the brackets 7 and 32, so that the passenger is fully protected from shock in colliding with the brace bars in the event he does not use his hands to brace himself.

The device is simple and inexpensive to manufacture, and is readily adapted to be installed on all modern automobiles merely by attaching a suitable bracket to the instrument panel.

What is claimed is:

1. In an automobile having an instrument panel, a front seat and a door hinged on the automobile adjacent the instrument panel and having a handle, a safety brace including a bar extending over the front of the seat transversely of the automobile and pivoted at its outer end on said door, a link pivotally connecting the inner end of said bar to said instrument panel, said link and bar adapted to swing outwardly and forwardly away from the seat as the door is opened, and a door operating shaft supported on said bar in parallel relation thereto, said shaft being operatively connected to the handle of said door.

2. In an automobile having an instrument panel, a front seat and a door hinged on the automobile adjacent the instrument panel and having a handle, a two-bar linkage pivotally connecting said door and said instrument panel, one bar extending from the door horizontally over the front of the seat when the door is closed, the other bar being a link extending forwardly from the inner end of said horizontal bar to a pivot on the instrument panel, said linkage adapted to swing forwardly of the seat when the door is opened, and a shaft supported on said horizontal bar in parallel relation thereto, the outer end of said shaft being operatively connected to the handle of said door.

3. In an automobile having an instrument panel, a front seat and a door hinged on the automobile adjacent the instrument panel and having a handle, a safety brace including a bar extending over the front of the seat transversely of the automobile and pivoted at its outer end on said door, a link pivotally connecting the inner end of said bar to said instrument panel, said link and bar adapted to swing outwardly and forwardly away from the seat as the door is opened, and a door operating shaft supported on said bar in parallel relation thereto, said shaft being axially rotatable, a handle on the inner end of said shaft, and a crank on the outer end engaging the door handle.

4. In an automobile having an instrument panel, a front seat and a door hinged on the automobile adjacent the instrument panel and having a handle, a two-bar linkage pivotally connecting said door and said instrument panel, one bar extending from the door horizontally over the front of the seat when the door is closed, the other bar being a link extending forwardly from the inner end of said horizontal bar to a pivot on the instrument panel, said linkage adapted to swing forwardly of the seat when the door is opened, and a horizontal shaft axially rotatably mounted on said horizontal bar, a handle on the inner end of said shaft, and means operatively connecting the outer end of the shaft with the handle of the door.

5. In an automobile having an instrument panel, a front seat and a door hinged on the automobile adjacent the instrument panel, a safety brace including a bar extending over the front of the seat transversely of the automobile and pivoted at its outer end on the door, a link pivotally connecting the inner end of said bar to said instrument panel, and said link and bar being adapted to swing outwardly and forwardly away from said seat as the door is swung open.

6. In an automobile having an instrument panel, a front seat and a door hinged on the automobile adjacent the instrument panel, a two-bar linkage pivotally connecting said door and said instrument panel, one bar extending from the door horizontally over the front of the seat transversely of the automobile when the door is closed, the other bar being a link pivoted to the inner end of said first bar and extending forwardly therefrom, and means pivoting the front end of said link on said instrument panel, said linkage being adapted to swing forwardly of the seat when the door is opened.

7. In an automobile having an instrument panel, a front seat and a door hinged on the automobile adjacent the instrument panel, a safety brace including vertically spaced parallel bars pivoted at their outer ends on said door and extending laterally therefrom over the front portion of said seat, links pivotally connected to the inner ends of said bars and extending forwardly therefrom, and means pivotally connecting the front ends of said links on said instrument panel, said linkage being adapted to swing forwardly of said seat when the door is opened.

8. In an automobile having an instrument panel, a front seat and a door hinged on the automobile adjacent the instrument panel, a safety brace including vertically spaced parallel bars pivoted at their outer ends on said door and extending laterally therefrom over the front portion of said seat, links pivotally connected to the inner ends of said bars and extending forwardly therefrom, means pivotally connecting the front ends of said links on said instrument panel, said linkage being adapted to swing forwardly of said seat when the door is opened, a door operating shaft extending parallel to said parallel bars, means mounting said shaft on said bars, and means operatively connecting said shaft to the handle of said door.

9. In an automobile having an instrument panel, a front seat and a door hinged on the automobile adjacent the instrument panel, a safety brace including vertically spaced parallel bars pivoted at their outer ends on said door and extending laterally therefrom over the front portion of said seat, links pivotally connected to the inner ends of said bars and extending forwardly therefrom, means pivotally connecting the front ends of said links on said instrument panel, said linkage being adapted to swing forwardly of said seat when the door is opened, a door operating shaft extending parallel to said parallel bars, means mounting said shaft on said bars for axial rotation, a handle on the inner end of said shaft, and a crank on the outer end of said shaft operatively connected to the handle of said door.

10. In an automobile having an instrument panel, a front seat and a door hinged on the automobile adjacent the instrument panel and having a handle, a safety brace including vertically spaced parallel bars pivoted at their outer ends on said door and extending laterally therefrom over the front portion of said seat, links pivotally connected to the inner ends of said bars and extending forwardly therefrom, means pivotally connecting the front ends of said links to said instrument panel, said linkage being adapted to swing forwardly of said seat when the door is opened, a door operating shaft parallel to said parallel bars and located therebetween, means mounting said shaft for axial rotation on said bars, a handle on the inner end of said shaft, and means operatively connecting the outer end of said shaft to said door handle.

11. In an automobile having an instrument panel, a front seat and a door hinged on the automobile adjacent the instrument panel, a safety brace including a bar extending over the front of the seat transversely of the automobile and pivoted at its outer end on the door, a link extending forwardly from the inner end of said bar pivotally connected at one end to the bar and at the other end to said instrument panel, said link and bar being constructed and arranged to swing forwardly away from the seat as the door is swung open, and the pivot between the bar and link being arranged to swing over center when the door is fully open, to lock the door in that position.

12. In an automobile having an instrument panel, a front seat and a door hinged on the automobile adjacent the instrument panel, a safety brace including a bar extending over the front of the seat transversely of the automobile and pivoted at its outer end on the door, a link extending forwardly from the inner end of said bar pivotally connected at one end to the bar and at the other end to said instrument panel, a covering of resilient cushion material on the rear side of said bar, said link and bar being constructed and arranged to swing forwardly away from the seat as the door is swung open, and the pivot between the bar and link being arranged to swing over center when the door is fully open, to lock the door in that position.

13. In an automobile having an instrument panel, a front seat and a door hinged on the automobile adjacent the instrument panel, a safety brace including vertically spaced bars extending transversely over the front of said seat and pivoted at their outer ends on said door, a link pivotally connected to the inner ends of said bars and extending forwardly therefrom to a pivot connection on the instrument panel, said bars and link being arranged to swing forwardly of the seat as the door is opened, and a resilient cushion covering the rear of said bars.

14. In an automobile having an instrument panel, a front seat and a door hinged on the automobile adjacent the instrument panel, a safety brace including vertically spaced bars extending transversely over the front of said seat and pivoted at their outer ends on said door, a link pivotally connected to the inner ends of said bars and extending forwardly therefrom to a pivot connection on the instrument panel, said bars and link being arranged to swing forwardly of the seat as the door is opened, a transversely extending door operating shaft mounted on said bars, and a resilient cushion covering the rear sides of said shaft and bars.

15. In an automobile having an instrument panel, a front seat and a door hinged on the automobile adjacent the instrument panel, a safety brace including vertically spaced bars extending transversely over the front of said seat and pivoted at their outer ends on said door, a link pivotally connected to the inner ends of said bars and extending forwardly therefrom to a pivot connection on the instrument panel, said bars and link being arranged to swing forwardly of the seat as the door is opened, a resilient cushion covering the rear sides of said bars, and an accessory receptacle mounted on the front sides of said bars.

References Cited in the file of this patent

UNITED STATES PATENTS

| Number | Name | Date |
|---|---|---|
| 1,775,256 | Rowe | Sept. 9, 1930 |
| 1,957,710 | Hennicke | May 8, 1934 |
| 2,198,796 | Williams | Apr. 30, 1940 |
| 2,245,899 | Campbell | June 17, 1941 |
| 2,563,248 | Kotzin | Aug. 7, 1951 |